(12) United States Patent
Parundekar et al.

(10) Patent No.: US 9,727,496 B1
(45) Date of Patent: Aug. 8, 2017

(54) BUS OPTIMIZATION TO LOG SENSOR DATA

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Rahul Parundekar, Sunnyvale, CA (US); Takuya Hasegawa, Kariya (JP)

(*) Notice: Subject to any disclaimer, the term of this patent is extended or adjusted under 35 U.S.C. 154(b) by 492 days.

(21) Appl. No.: 14/476,437

(22) Filed: Sep. 3, 2014

(51) Int. Cl.
*G06F 13/00* (2006.01)
*G06F 13/12* (2006.01)

(52) U.S. Cl.
CPC .................. *G06F 13/126* (2013.01)

(58) Field of Classification Search
CPC ............................ G06F 13/126; G06F 13/00
USPC ........ 710/104–105, 305–306, 100; 701/29.3, 701/29.9, 109, 60, 267
See application file for complete search history.

(56) References Cited

U.S. PATENT DOCUMENTS

| 2004/0081200 | A1 | 4/2004 | Vollmer et al. | |
| 2014/0200038 | A1* | 7/2014 | Rao | H04L 67/2847 455/457 |
| 2015/0032324 | A1* | 1/2015 | Ichinose | B60W 30/143 701/23 |
| 2016/0300378 | A1* | 10/2016 | Thomas | G06T 13/20 |

FOREIGN PATENT DOCUMENTS

WO 2008072734 A1 6/2008

* cited by examiner

*Primary Examiner* — Tim T Vo
*Assistant Examiner* — Kim T. Huynh
(74) *Attorney, Agent, or Firm* — Burbage Law, P.C.; Jon-Michael Burbage; Elizabeth Ruzich

(57) ABSTRACT

The disclosure includes a system and method for optimizing a bus to log sensor data. The system includes a processor and a memory storing instructions that, when executed by the processor, cause the system to: estimate a use case of a journey of a mobile device; retrieve a set of sensor configuration parameters associated with the estimated use case; and configure one or more sensors according to the set of sensor configuration parameters to operate during at least a portion of the journey according to the set of sensor configuration parameters.

20 Claims, 7 Drawing Sheets

BUS OPTIMIZATION TO LOG SENSOR DATA

BACKGROUND

The specification relates to optimizing a bus to log sensor data in vehicles and other mobile devices.

Sensors in vehicles and other mobile devices may generate a relatively large amount of data that may be collected and logged over a communication bus. In some instances, a capacity of the communication bus may be insufficient to collect all sensor data generated by the sensors. As a result, data acquisition performance may be reduced.

SUMMARY

According to one innovative aspect of the subject matter described in this disclosure, a system for optimizing a bus to log sensor data includes a processor and a memory storing instructions that, when executed by the processor, cause the system to: estimate a use case of a journey of a mobile device; retrieve a set of sensor configuration parameters associated with the estimated use case; and configure one or more sensors according to the set of sensor configuration parameters to operate during at least a portion of the journey according to the set of sensor configuration parameters.

In general, another innovative aspect of the subject matter described in this disclosure may be embodied in methods that include: estimating a use case of a journey of a mobile device; retrieving a set of sensor configuration parameters associated with the estimated use case; and configuring one or more sensors according to the set of sensor configuration parameters to operate during at least a portion of the journey according to the set of sensor configuration parameters.

Other aspects include corresponding methods, systems, apparatus, and computer program products for these and other innovative aspects.

These and other implementations may each optionally include one or more of the following operations and features. For instance, the features include the mobile device includes a vehicle, the operations further include estimating the use case responsive to the vehicle being started and receiving data that indicates the journey is to be a private journey in which the one or more sensors are disabled, and the features include estimating the use case includes estimating the use case as a private use case in which the one or more sensors are disabled, the set of sensor configuration parameters indicates that each of the one or more sensors is to be disabled, and configuring the one or more sensors according to the set of sensor configuration parameters includes disabling each of the one or more sensors during the at least the portion of the journey. For instance, the features include the journey is a first journey and the operations further include determining that the private use case is ended and estimating a subsequent use case after the private use case is ended. For instance, the features include determining that the private use case is ended responsive to at least one of: completion of a particular duration of time since a start of the first journey, completion of a second journey subsequent to the first journey; or the vehicle being started twice since the start of the first journey. For instance, the operations further include receiving data that indicates the journey is to be a private journey and the features include: estimating the use case includes estimating the use case as a private use case, and the set of sensor configuration parameters indicates that a first one of the one or more sensors that generates sensor data that relates to safety logging of a user is to be enabled during the at least the portion of the journey and that others of the one or more sensors that do not generate sensor data that relates to safety logging are to be disabled during the at least the portion of the journey. For instances, the operations further include receiving data that indicates the journey is to be a private journey, and anonymizing sensor data generated by the one or more sensors during the at least the portion of the journey. For instance, the features include the mobile device is a vehicle and the set of sensor configuration parameters is tuned to a particular driver of the vehicle. For instance, the features include the estimated use case includes an estimated first use case and the operations further include: estimating multiple use cases that the mobile device may experience during the journey, the estimated use cases including the estimated first use case and each of the estimated use cases including a different one of multiple sets of sensor configuration parameters; and reconfiguring the one or more sensors according to a corresponding one of the plurality of sets of sensor configuration parameters each time an estimated current use case of the mobile device changes from one of the estimated use cases to a different one of the estimated use cases. For instance, the operations further include, during the journey: determining that the estimated use case of the journey of the mobile device has changed such that the estimated use case is an estimated preceding use case, estimating a current use case of the journey of the mobile device, the estimated current use case being different than the estimated preceding use case, retrieving a set of sensor configuration parameters associated with the estimated current use case that is different than the set of sensor configuration parameters associated with the estimated preceding use case, and reconfiguring the one or more sensors according to the set of sensor configuration parameters associated with the estimated current use case to operate during at least a second portion of the journey according to the set of sensor configuration parameters associated with the estimated current use case.

The disclosure is particularly advantageous in a number of respects. For example, the system described herein may optimize a bus to log sensor data that is relevant to a particular driver experience and/or use case that is being monitored. The bus may be optimized by only or primarily collecting sensor data that is relevant to the driver experience and/or the use case that is being monitored. For a given driver experience and/or use case, some sensor data may be more relevant or important than other sensor data. Some implementations described herein may change the configuration of the sensors that are logged, e.g., by enabling or disabling sensors and/or adjusting up or down the sampling frequency, duration of sampling time, sampling precision, compression format, and/or other parameters of the enabled sensors according to the driver experience and/or use case being monitored. Some implementations described herein may thereby reduce and/or eliminate the presence of sensor data on the bus that is not relevant to the driver experience and/or use case being monitored.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
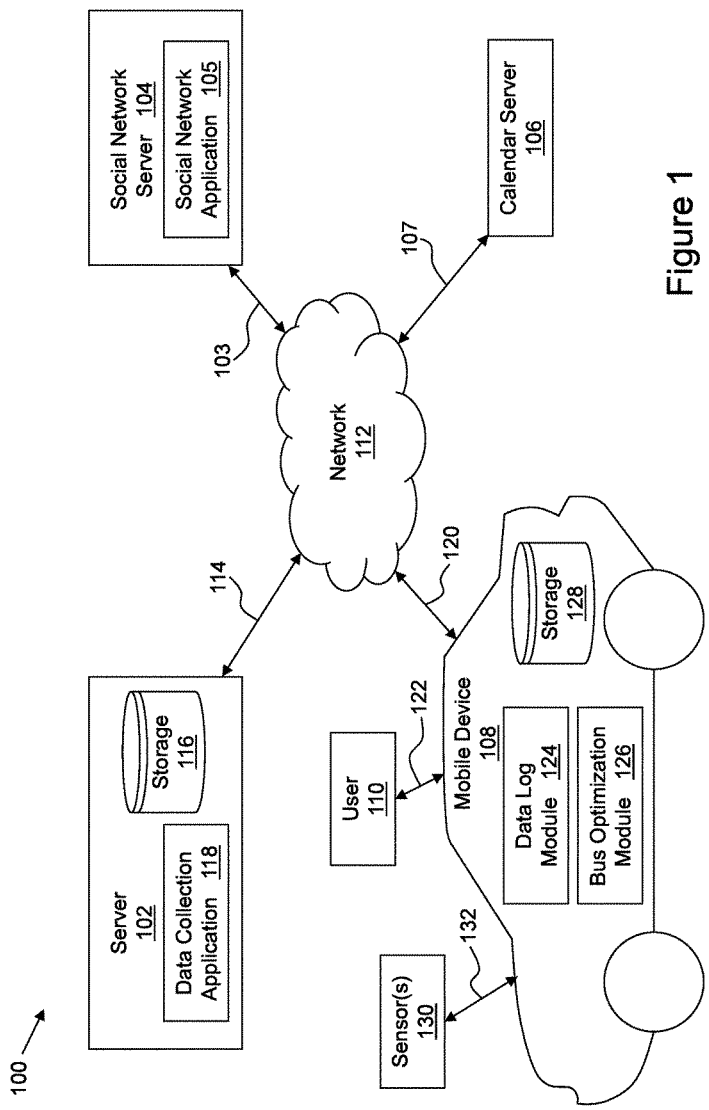
FIG. 1 is a block diagram illustrating an example system for optimizing a bus to log sensor data.

FIG. 1 illustrates a block diagram of some implementations of a system 100 in which a bus may be optimized to log sensor data. The system 100 includes a server 102, a social network server 104, a calendar server 106, and a mobile device 108. The mobile device 108 can be accessed by a user 110. In the illustrated implementation, these entities of the system 100 may be communicatively coupled via a network 112. The system 100 may include other servers or devices not shown in FIG. 1 including, for example, a traffic server for providing traffic data, a weather server for providing weather data, and a map server for providing map data, etc.

The mobile device 108 in FIG. 1 is illustrated by way of example. While FIG. 1 illustrates a single mobile device 108, the disclosure applies to a system architecture having one or more mobile devices 108. Furthermore, although FIG. 1 illustrates one network 112 coupled to the mobile device 108, the server 102, the social network server 104, and the calendar server 106, in practice one or more networks 112 can be connected to these entities. While FIG. 1 includes one server 102, one social network server 104, and one calendar server 106, the system 100 could include one or more servers 102, one or more social network servers 104, and one or more calendar servers 106.

The network 112 can be a conventional type, wired or wireless, and may have numerous different configurations including a star configuration, token ring configuration, or other configurations. Furthermore, the network 112 may include a local area network (LAN), a wide area network (WAN) (e.g., the Internet), or other interconnected data paths across which multiple devices and/or entities may communicate. In some implementations, the network 112 may be a peer-to-peer network. The network 112 may also be coupled to or includes portions of a telecommunications network for sending data in a variety of different communication protocols. In some implementations, the network 112 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 112 may include a global positioning system (GPS) satellite or multiple GPS satellites for providing GPS navigation to the mobile device 108. The network 112 may be a mobile data network that may include third-generation (3G), fourth-generation (4G), long-term evolution (LTE), Voice-over-LTE ("VoLTE") or any other mobile data network or combination of mobile data networks.

The server 102 can be a hardware server that includes a processor, a memory, and network communication capabilities. In the illustrated implementation, the server 102 is coupled to the network 112 via a signal line 114. The server 102 sends and receives data to and from other entities of the system 100 via the network 112. The server 102 includes storage 116 for storing data to provide at least some of the functionality described herein. The storage 116 is described below in more detail. In the illustrated implementation, the server 102 includes a data collection application 118. The server 102 may execute the data collection application 118 to collect data from one or more mobile devices that may include the mobile device 108 and to write the data to and/or read the data from the storage 116. The collected data can be used for any of a variety of purposes, including for behavioral, safety, and/or performance monitoring of specific mobile devices, of a group or groups of mobile devices, of specific users of the mobile devices, and/or of a group or groups of users, for generating traffic information, and/or for any other suitable purpose.

The social network server 104 can be a hardware server that includes a processor, a memory, and network communication capabilities. In the illustrated implementation, the social network server 104 is coupled to the network 112 via a signal line 103. The social network server 104 sends and receives data to and from other entities of the system 100 via the network 112. The social network server 104 includes a social network application 105. A social network can be a type of social structure where the user 110 and other users may be connected by a common feature or features. Each of the common features may include relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 104 and the social network application 105 can be representative of one social network and there may be multiple social networks coupled to the network 112, each having its own server, application, and social graph. For example, a first social network may be more directed to business networking, a second may be more directed to or centered on academics, a third may be more directed to local business, a fourth may be directed to dating, and others may be of general interest or a specific focus.

The calendar server 106 can be a hardware server that includes a processor, a memory, and network communication capabilities. In the illustrated implementation, the calendar server 106 is coupled to the network 112 via a signal line 107. The calendar server 106 sends and receives data to and from other entities of the system 100 via the network 112. For example, the calendar server 106 may send data describing a user's calendar to the server 102 with permission from the user.

In some implementations, the mobile device 108 may include a vehicle (e.g., an automobile, a bus), a bionic implant, a wearable device, a laptop computer, a tablet computer, a mobile telephone, a personal digital assistant (PDA), a mobile e-mail device, a portable game player, a portable music player, or another electronic device that is capable of accessing the network 112. In some implementations, the mobile device 108 may include a computing device that includes a memory and a processor. In the illustrated implementation, the mobile device 108 is communicatively coupled to the network 112 via a signal line 120. The user 110 may interact with the mobile device 108 via a signal line 122. The user 110 may include a driver of the mobile device 108 implemented as a vehicle, or more generally a user or operator of the mobile device 108.

In some implementations, the mobile device 108 may include a data log module 124, a bus optimization module 126, and storage 128 for storing data to provide at least some of the functionality described herein. The data log module 124, the bus optimization module 126, and the storage 128 will be described in more detail below.

In some implementations, the mobile device 108 may include and/or may be communicatively coupled to one or more sensors 130 (labeled "Sensor(s) 130" in the Figures and referred to hereinafter as sensor 130 or sensors 130). The sensor 130 may be coupled to the mobile device 108 via a signal line 132. Each of the sensors 130 may include, but is not limited to, a navigation sensor (e.g., a global positioning system (GPS) sensor), an infrared detector, a motion detector, a thermostat, a sound detector, or any other type of sensor. For example, the mobile device 108 may include sensors 130 for measuring one or more of a current time, a location (e.g., a latitude, longitude, and altitude of a location), an acceleration of a vehicle, a velocity of a vehicle, a fuel tank level, a behavior of a driver, environmental information inside and/or outside of the vehicle, etc. The sensors 130 may generate sensor data describing the measurements and the sensor data may be aggregated from the mobile device 108 and/or from other mobile devices by the data collection application 118.

The data log module 124 may include code and routines for logging sensor data associated with a user or a vehicle, which sensor data may be generated by the sensors 130. In some implementations, the sensor data may be recorded in the storage 128. The sensor data may include journey data, driver data, situation data, time synchronicity data, and/or other data as described in more detail below. In some implementations, the data log module 124 can be implemented using hardware including a field-programmable gate array (FPGA) or an application-specific integrated circuit (ASIC). In some other implementations, the data log module 124 can be implemented using a combination of hardware and software. The sensor data logged by the data log module 124 for the mobile device 108 may be aggregated at the server 102 with sensor data from other mobile devices by the data collection application 118 and may be stored in the storage 116. The data log module 124 may be stored in a combination of the devices and servers, or in one of the devices or servers of FIG. 1. The data log module 124 is described below in more detail with reference to FIG. 2.

The bus optimization module 126 may include code and routines for optimizing a bus over which the sensor data is collected and logged by the data log module 124. In some implementations, the bus optimization module 126 can be implemented using hardware including an FPGA or an ASIC. In some other implementations, the bus optimization module 126 can be implemented using a combination of hardware and software. The bus optimization module 126 may be stored in a combination of the devices and servers, or in one of the devices or servers of FIG. 1. The bus optimization module 126 is described below in more detail with reference to FIG. 3A.

Each of the storage 116 and the storage 128 can include a non-transitory storage medium that stores data for providing the functionality described herein. The storage 116 and/or 128 may include a dynamic random access memory (DRAM) device, a static random access memory (SRAM) device, flash memory, or some other memory devices. In some implementations, the storage 116 and/or 128 may also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage 116 stores sensor data and/or other data collected from the mobile device 108 and/or other mobile devices. Additionally or alternatively, the storage 116 may store use case templates that may be provided by the server 102 to the mobile device 108 and/or to other mobile devices. In some implementations, the storage 128 stores use case estimation data, sensor configuration data, sensor data, and/or other data. The sensor data stored in the storage 116 may include sensor data aggregated from multiple mobile devices. The use case estimation data may include, but is not limited to, sensor data, journey data, situation data, use case templates, and user profile data. The journey data may be associated with the user 110 and/or the mobile device 108 and may describe journeys previously taken by the user 110 and/or the mobile device 108. The journey data may include data describing one or more of a start point, an end point, a departure time from the start point, an arrival time at the end point, a route, a journey duration, a direction, and other journey context data associated with each of one or more journeys taken by the user 110. The use case templates may include data describing different use cases defined for different driver experiences. In some implementations, the use case templates are distributed by the server 102 to the mobile device 108 and/or to other mobile devices. The user profile data can be data describing user profiles. For example, the user profile data associated with the user 110 may include a user name, an e-mail address, user preferences, hobbies, interests, education, work experience, driving behavior, and other demographic data describing the user 110. The sensor configuration data may include different sets of sensor configuration parameters associated with each of the use cases described by the use case templates.

In some implementations, the bus optimization module 126 may use one or more of the use case estimation data, the sensor configuration data, and/or other data to optimize—in the mobile device 108—a bus for logging the sensor data generated by the sensors 130. In some implementations, the bus optimization module 126 may estimate a use case of a journey of the mobile device 108 using the use case estimation data. The bus optimization module 126 may retrieve, from the sensor configuration data, a set of sensor configuration parameters associated with the estimated use case. The bus optimization module 126 may configure the sensors 130 according to the set of sensor configuration parameters to operate during at least a portion of the journey according to the set of sensor configuration parameters. Additionally or alternatively, the bus optimization module 126 may determine from the sensor data generated by the sensors 130 and/or from other data that the estimated use case has changed to a different estimated use case during the journey, may retrieve a corresponding set of sensor configuration parameters, and may reconfigure the one or more sensors according to the corresponding set of sensor configuration parameters to operate during at least a subsequent portion of the journey according to the corresponding set of sensor configuration parameters.

In some implementations, each of the sets of sensor configuration parameters may indicate at least one of: which of the sensors 130 to enable, which of the sensors 130 to disable, a sampling frequency of at least one of the sensors 130 that is enabled, a duration of time for which data from at least one of the sensors 130 is to be sampled, a sampling precision of at least one of the sensors 130 that is enabled, a compression format of sensor data generated by at least one of the sensors 130 that is enabled, and other sensor configuration parameters. In some implementations, configuring the sensors 130 according to the set of sensor configuration parameters to operate during at least a corresponding portion of the journey may include enabling at least some and/or disabling at least some of the sensors 130, setting a sampling frequency of at least one of the sensors 130 that is enabled, setting a duration of time for which data from at least one of the sensors 130 is to be sampled, setting a sampling precision of at least one of the sensors 130 that is enabled, setting a compression format of sensor data generated by at least one of the sensors 130 that is enabled, and otherwise configuring the sensors 130 according to the retrieved set of sensor configuration parameters.

Example Data Log Module

Figure 2:
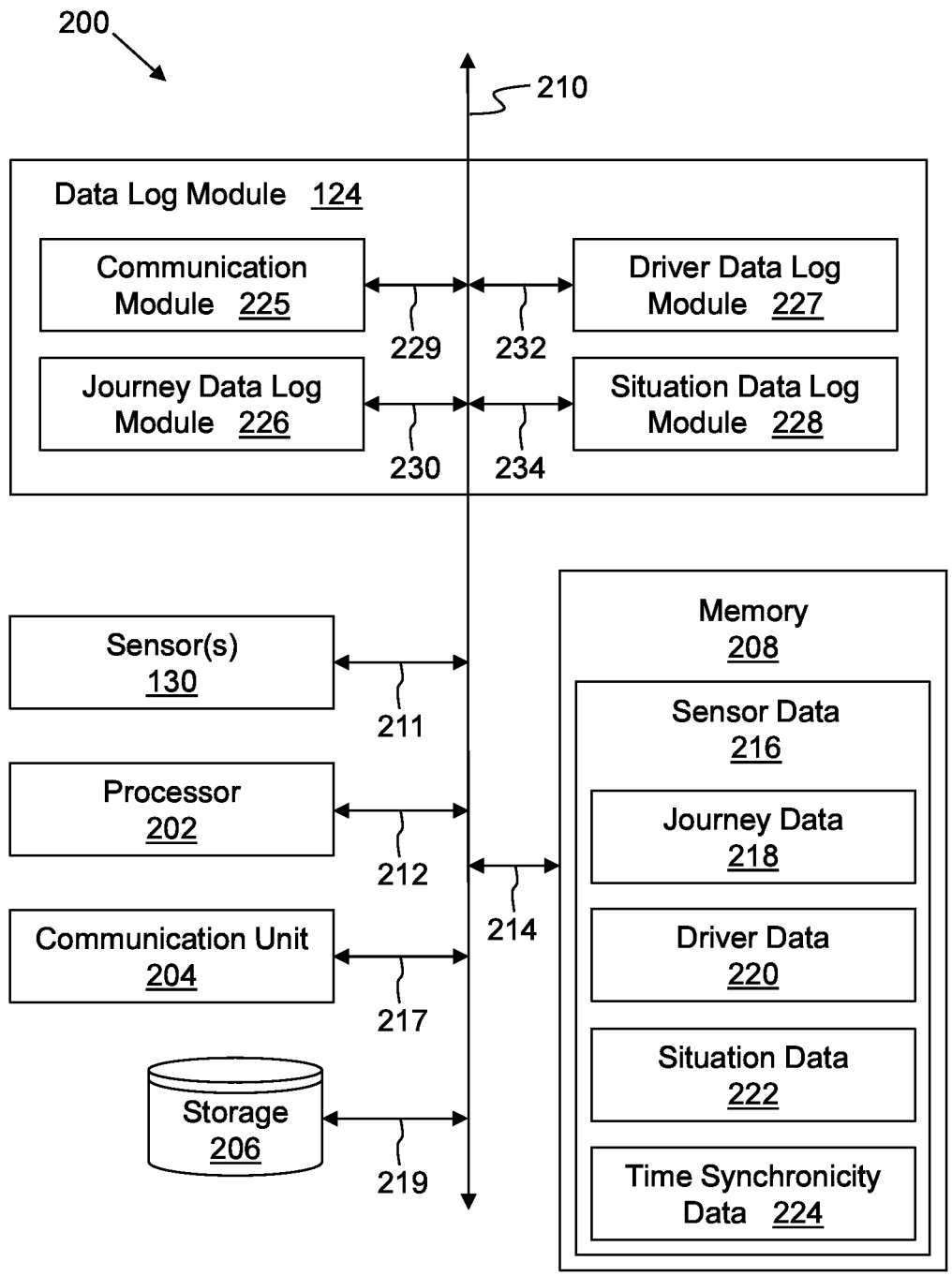
FIG. 2 is a block diagram illustrating an example computing device that includes an example data log module.

Referring now to FIG. 2, an example of the data log module 124 is shown in more detail. FIG. 2 is a block diagram of a computing device 200 that includes the data log module 124, a processor 202, a communication unit 204, a storage 206, and a memory 208 according to some examples. The components of the computing device 200 are communicatively coupled by a bus 210. The bus 210 may include, but is not limited to, a controller area network (CAN) bus, a memory bus, a storage interface bus, a bus/interface controller, an interface bus, or the like or any combination thereof. In some implementations, the computing device 200 additionally includes the sensors 130 coupled to the bus 210 via a signal line 211. Additionally or alternatively, the computing device 200 can be one of the server 102 and the mobile device 108.

The processor 202 includes an arithmetic logic unit, a microprocessor, a general-purpose controller, or some other processor array to perform computations and provide electronic display signals to a display device. The processor 202 is coupled to the bus 210 for communication with the other components via a signal line 212. The processor 202 processes data signals and may include various computing architectures including a complex instruction set computer (CISC) architecture, a reduced instruction set computer (RISC) architecture, or an architecture implementing a combination of instruction sets. Although FIG. 2 includes a single processor 202, multiple processors 202 may be included. Other processors, operating systems, sensors, displays, and physical configurations may be possible.

The memory 208 stores instructions or data that may be executed by the processor 202. The memory 208 is coupled to the bus 210 for communication with the other components via a signal line 214. The instructions or data may include code for performing the techniques described herein. The memory 208 may be a dynamic random access memory (DRAM) device, a static random access memory (SRAM) device, flash memory, or some other memory device. In some implementations, the memory 208 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

As illustrated in FIG. 2, the memory 208 stores sensor data 216. The sensor data 216 may be generated by the sensors 130 and may include journey data 218, driver data 220, situation data 222, and time synchronicity data 224. The journey data 218 may include data describing a user's historical journeys. The driver data 220 may include data describing a behavior of a driver while operating a vehicle that may include the computing device 200. The situation data 222 may include environmental data or other data describing what is happening inside and/or outside of the vehicle while it is operated. The time synchronicity data 224 can be data used to synchronize a device time with a universal time. For example, the time synchronicity data 224 can be configured to synchronize a local time associated with the vehicle with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks. Although not illustrated in FIG. 2, the sensor data 216 may additionally include data generated as an aggregate of data collected from multiple journeys with the same or different use cases. The sensor data 216 may be collected for and/or in the context of one or more driver experiences and associated use cases.

The communication unit 204 transmits and receives data to and from at least one of the mobile device 108, the server 102, and any other entities of the system 100 of FIG. 1. The communication unit 204 is coupled to the bus 210 via a signal line 217. In some implementations, the communication unit 204 includes a port for direct physical connection to the network 112 of FIG. 1 or to another communication channel. For example, the communication unit 204 may include a universal serial bus (USB) port, a secure digital (SD) port, a category 5 cable (CAT-5) port, or similar port for wired communication with the mobile device 108 or the server 102. In some implementations, the communication unit 204 includes a wireless transceiver for exchanging data with at least one of the mobile device 108, the server 102, and any other entities of the system 100 of FIG. 1 or other communication channels using one or more wireless communication methods, including IEEE 802.11, IEEE 802.16, BLUETOOTH®, or another suitable wireless communication method.

In some implementations, the communication unit 204 includes a cellular communications transceiver for sending and receiving data over a cellular communications network including via SMS, MMS, HTTP, direct data connection, WAP, e-mail, or another suitable type of electronic communication. In some implementations, the communication unit 204 includes a wired port and a wireless transceiver. The communication unit 204 also provides other conventional connections to the network 112 of FIG. 1 for distribution of files or media objects using standard network protocols including transmission control protocol/internet protocol (TCP/IP), HTTP, hypertext transfer protocol secure (HTTPS), and simple mail transfer protocol (SMTP), etc.

The storage 206 can be a non-transitory storage medium that stores data for providing the functionality described herein. The storage 206 may correspond to or be an example of the storage 116 and/or the storage 128 of FIG. 1. The storage 206 may be a dynamic random access memory (DRAM) device, a static random access memory (SRAM) device, flash memory, or some other memory devices. In some implementations, the storage 206 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 206 is communicatively coupled to the bus 210 via a signal line 219. The storage 206 may also store data that was temporarily stored in the memory 208.

In the illustrated implementation, the data log module 124 includes a communication module 225, a journey data log module 226, a driver data log module 227, and a situation data log module 228. The components of the data log module 124 are communicatively coupled to the bus 210. For example, the communication module 225 is communicatively coupled to the bus 210 via a signal line 229. The journey data log module 226 is communicatively coupled to the bus 210 via a signal line 230. The driver data log module 227 is communicatively coupled to the bus 210 via a signal line 232. The situation data log module 228 is communicatively coupled to the bus 210 via a signal line 234.

The communication module 225 can be software including routines for handling communications between the journey data log module 226, the driver data log module 227, the situation data log module 228, and other components of the computing device 200. The communication module 225 sends and receives data, via the communication unit 204, to and from one or more of the mobile device 108, the server 102, and/or other entities of the system 100 of FIG. 1 depending upon where the data log module 124 is stored. In some implementations, the communication module 225 receives sensor data from the journey data log module 226, the driver data log module 227, and/or the situation data log module 228 and stores the sensor data in one or more of the storage 206 and the memory 208. In some implementations, the communication module 225 retrieves sensor data from the storage 206 or the memory 208 and sends the sensor data to the data collection application 118 of FIG. 1.

The journey data log module 226 can be software including routines for aggregating journey data describing one or more journeys associated with the user 110 and/or the mobile device 108 of FIG. 1. For example, the journey data log module 226 may record journey data associated with a vehicle or a user and may store the journey data in the storage 206 or the memory 208 via the communication module 225. Additionally or alternatively, the journey data log module 226 uploads the journey data to the server 102 via the communication module 225 and the communication unit 204. Additionally or alternatively, the journey data log module 226 sends the journey data to the bus optimization module 126 via at least one of the communication module 225 and the communication unit 204.

The journey data recorded by the journey data log module 226 may include, but is not limited to, an identifier (ID) identifying the mobile device 108 (e.g., a vehicle identification number), one or more user IDs identifying one or more users associated with the mobile device 108 (e.g., a driver in a vehicle, a passenger in the vehicle), a start point, a destination, a journey duration, a route, a time of arrival, a time of departure, one or more points of interest along the route, and other data associated with a related journey.

The driver data log module 227 can be software including routines for aggregating driver data describing a behavior of a driver while operating the mobile device 108. For example, the driver data log module 227 may record driver data associated with a vehicle or a driver and may store the driver data in the storage 206 or the memory 208 via the communication module 225. Additionally or alternatively, the driver data log module 227 uploads the driver data to the server 102 via the communication module 225 and the communication unit 204. Additionally or alternatively, the driver data log module 227 sends the driver data to the bus optimization module 126 via at least one of the communication module 225 and the communication unit 204.

The driver data recorded by the driver data log module 227 may include, but is not limited to, an identifier (ID) identifying the mobile device 108 (e.g., a vehicle identification number), one or more user IDs identifying one or more drivers associated with the mobile device 108, and data representing a behavior of the one or more drivers that may indicate interactions of the one or more drivers with one or more passengers and/or with one or more control elements of the mobile device 108. The control elements of the mobile device 108 with which the one or more drivers may interact and for which driver data may be generated by one or more of the sensors 130 may include, but are not limited to, a steering wheel, a brake pedal, a gas pedal, a clutch pedal, a heating and/or air conditioning control system, and an infotainment system.

The situation data log module 228 can be software including routines for aggregating situation data describing an environment around or within the mobile device 108 and/or describing what is happening in the environment. For example, the situation data log module 228 may record situation data associated with a vehicle, a user, and/or a journey and may store the situation data in the storage 206 or the memory 208 via the communication module 225. Additionally or alternatively, the situation data log module 228 uploads the situation data to the server 102 via the communication module 225 and the communication unit 204. Additionally or alternatively, the situation data log module 228 sends the situation data to the bus optimization module 126 via at least one of the communication module 225 and the communication unit 204.

The situation data recorded by the situation data log module 228 may include, but is not limited to, an identifier (ID) identifying the mobile device 108 (e.g., a vehicle identification number), one or more user IDs identifying one or more users associated with the mobile device 108 (e.g., a driver in a vehicle, a passenger in the vehicle), and data indicating at least one of a condition in an environment external to a vehicle (e.g., temperature, precipitation, visibility, humidity, etc.), a condition in an environment internal to the vehicle, a noise level in the environment internal to the vehicle, or other data that may indicate what is occurring around and/or within the vehicle.

Example Bus Optimization Module

Figure 3A:
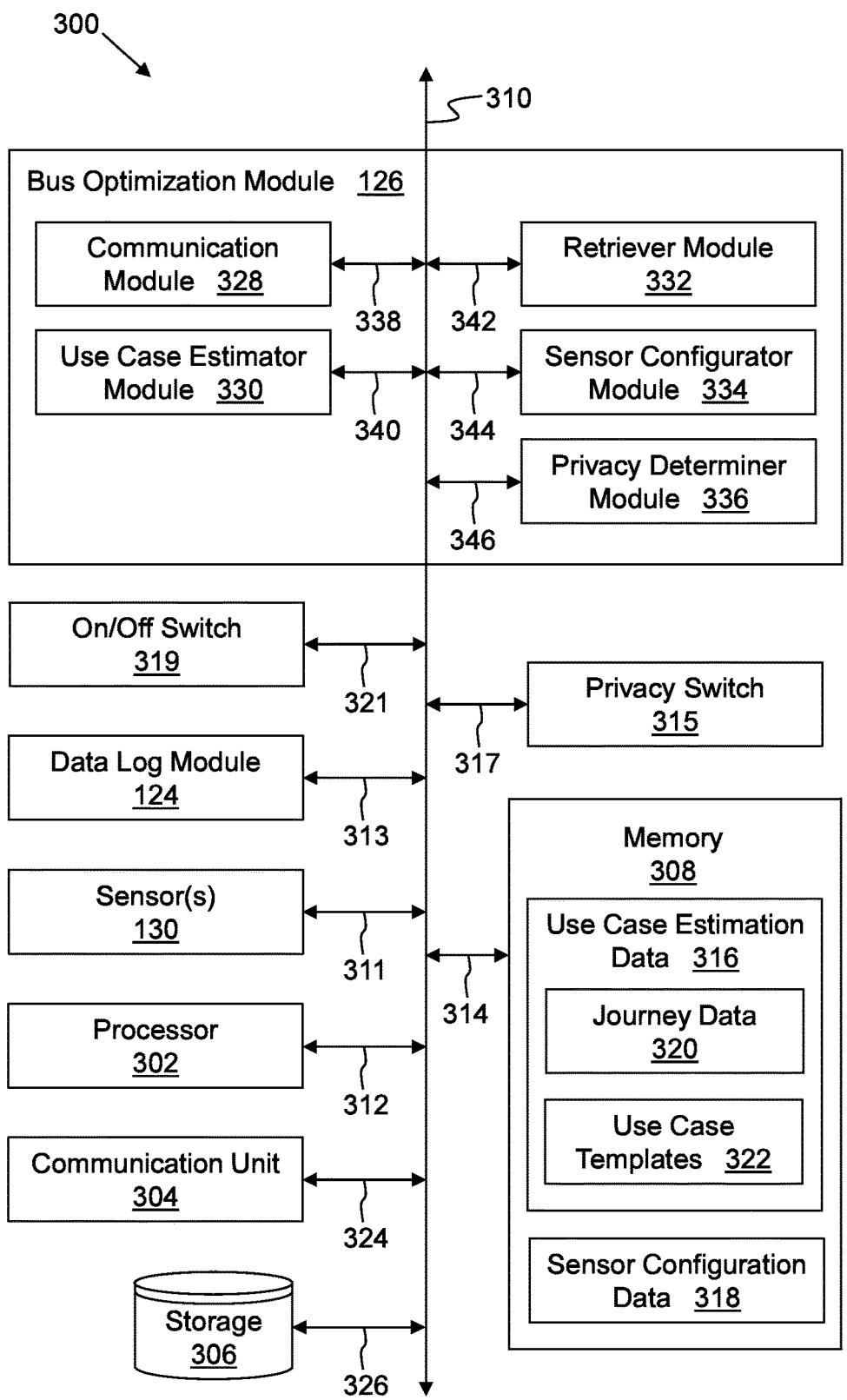
FIG. 3A is a block diagram illustrating an example computing device that includes an example bus optimization module.

Referring now to FIG. 3A, an example of the bus optimization module 126 is shown in more detail. FIG. 3A is a block diagram of a computing device 300 that includes the bus optimization module 126, a processor 302, a communication unit 304, a storage 306, and a memory 308 according to some examples. The components of the computing device 300 are communicatively coupled by a bus 310. The bus 310 may include, but is not limited to, a CAN bus, a memory bus, a storage interface bus, a bus/interface controller, an interface bus, or the like or any combination thereof. In some implementations, the computing device 300 additionally includes the sensors 130 coupled to the bus 310 via a signal line 311, the data log module 124 coupled to the bus 310 via a signal line 313, a privacy switch 315 coupled to the bus 310 via a signal line 317, and an on/off switch 319 coupled to the bus 310 via a signal line 321. Additionally or alternatively, the computing device 300 can be one of the server 102 and the mobile device 108.

The privacy switch 315 may include one or more user interface elements with which a user can interact to activate a private mode. Activation of the private mode may include an indication by the user, e.g., through the privacy switch 315, that the user desires a journey to be a private journey in which data collection is disabled and/or anonymized. The privacy switch 315 may include hardware, software, or a combination of hardware and software. In some implementations, the privacy switch 315 includes a light or other indicator that provides visual or other feedback to the user to confirm when the user has activated the private mode. The light or other indicator that provides visual or other feedback to the user may remain on while the private mode is activated and/or may be turned off when the private mode is deactivated or ends.

The on/off switch 319 may include one or more user interface elements with which a user can interact to turn the computing device 300 on and/or off. For example, the on/off switch 319 may include a vehicle ignition. More generally, the on/off switch 319 may include hardware, software, or a combination of hardware and software for turning the computing device 300 on and/or off.

The processor 302 includes an arithmetic logic unit, a microprocessor, a general-purpose controller, or some other processor array to perform computations and provide electronic display signals to a display device. The processor 302 is coupled to the bus 310 for communication with the other components via a signal line 312. The processor 302 processes data signals and may include various computing architectures including a complex instruction set computer (CISC) architecture, a reduced instruction set computer (RISC) architecture, or an architecture implementing a combination of instruction sets. Although FIG. 3A includes a single processor 302, multiple processors 302 may be included. Other processors, operating systems, sensors, displays, and physical configurations may be possible.

The memory 308 stores instructions or data that may be executed by the processor 302. The memory 308 is coupled to the bus 310 for communication with the other components via a signal line 314. The instructions or data may include code for performing the techniques described herein. The memory 308 may be a dynamic random access memory (DRAM) device, a static random access memory (SRAM) device, flash memory, or some other memory device. In some implementations, the memory 308 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

As illustrated in FIG. 3A, the memory 308 stores use case estimation data 316 and sensor configuration data 318. The use case estimation data 316 may include journey data 320 and use case templates 322. The journey data 320 and the use case templates 322 may be received from one or both of the data log module 124 or the server 102 or from some other source. The journey data 320 may include data describing a user's historical journeys. The use case templates 322 may include data describing different use cases defined for different driver experiences.

The communication unit 304 transmits and receives data to and from at least one of the mobile device 108, the server 102, and any other entities of the system 100 of FIG. 1. The communication unit 304 is coupled to the bus 310 via a signal line 324. In some implementations, the communication unit 304 includes a port for direct physical connection to the network 112 of FIG. 1 or to another communication channel. For example, the communication unit 304 may include a USB port, an SD port, a CAT-5 port, or similar port for wired communication with the mobile device 108 or the server 102. In some implementations, the communication unit 304 includes a wireless transceiver for exchanging data with at least one of the mobile device 108, the server 102, and any other entities of the system 100 of FIG. 1 or other communication channels using one or more wireless communication methods, including IEEE 802.11, IEEE 802.16, BLUETOOTH®, or another suitable wireless communication method.

In some implementations, the communication unit 304 includes a cellular communications transceiver for sending and receiving data over a cellular communications network including via SMS, MMS, HTTP, direct data connection, WAP, e-mail, or another suitable type of electronic communication. In some implementations, the communication unit 304 includes a wired port and a wireless transceiver. The communication unit 304 also provides other conventional connections to the network 112 of FIG. 1 for distribution of files or media objects using standard network protocols including TCP/IP, HTTP, HTTPS, and SMTP, etc.

The storage 306 can be a non-transitory storage medium that stores data for providing the functionality described herein. The storage 306 may correspond to or be an example of the storage 116 and/or the storage 128 of FIG. 1. The storage 306 may be a dynamic random access memory (DRAM) device, a static random access memory (SRAM) device, flash memory, or some other memory devices. In some implementations, the storage 306 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 306 is communicatively coupled to the bus 310 via a signal line 326. The storage 306 may also store data that was temporarily stored in the memory 308.

In the illustrated implementation, the bus optimization module 126 includes a communication module 328, a use case estimator module 330, a retriever module 332, and a sensor configurator module 334. Additionally or alternatively, the bus optimization module 126 further includes a privacy determiner module 336. The components of the bus optimization module 126 are communicatively coupled to the bus 310. For example, the communication module 328 is communicatively coupled to the bus 310 via a signal line 338. The use case estimator module 330 is communicatively coupled to the bus 310 via a signal line 340. The retriever module 332 is communicatively coupled to the bus 310 via a signal line 342. The sensor configurator module 334 is communicatively coupled to the bus 310 via a signal line 344. The privacy determiner module 336 is communicatively coupled to the bus 310 via a signal line 346.

The communication module 328 can be software including routines for handling communications between the use case estimator module 330, the retriever module 332, the sensor configurator module 334, the privacy determiner module 336, and other components of the computing device 300. The communication module 328 sends and receives data, via the communication unit 304, to and from one or more of the mobile device 108, the server 102, and/or other entities of the system 100 of FIG. 1 depending upon where the bus optimization module 126 is stored. In some implementations, the communication module 328 receives data from the use case estimator module 330, the retriever module 332, the sensor configurator module 334, and/or the privacy determiner module 336 and stores the data in one or more of the storage 306 and the memory 308. In some implementations, the communication module 328 retrieves data from the storage 306 or the memory 308 and sends the data to the use case estimator module 330, the retriever module 332, the sensor configurator module 334, and/or the privacy determiner module 336.

The use case estimator module 330 can be software including routines for estimating a use case of a journey of the mobile device 108. For example, the use case estimator module 330 may use historical journey data and/or other data to estimate a journey, e.g., when the journey will occur, an endpoint of the journey, a route of the journey, and/or other associated journey context (e.g., traffic, weather, road conditions, and/or other journey context). The use case estimator 330 may also estimate a use case for the estimated journey based on use case templates that define use cases for one or more driver experiences. In some implementations, the use case estimator module 330 may estimate the use case by comparing one or more parameters and/or characteristics of the estimated journey to one or more parameters and/or characteristics of the use case templates. For example, a use case defined by a use case template may be determined as the estimated use case depending on how well the one or more parameters and/or characteristics of the estimated journey match the one or more parameters and/or characteristics of the use case template. Additionally or alternatively, the use case estimator module 330 may update or modify the estimated use case to an estimated current use case responsive to changes to the journey as indicated by new and/or current journey data. In these and other implementations, the use case estimator module 330 may estimate the current use case by comparing one or more parameters and/or characteristics of the journey as indicated by new and/or current journey data to one or more parameters and/or characteristics of the use case templates.

The driver experiences may represent or include different experiences for which it may be useful to collect data and/or may target behavior of a particular metric that may be better understood based on the collected data. The collected data may thereby be used for behavioral, safety, and/or performance monitoring relating to the driver experiences of specific mobile devices, of a group or groups of mobile devices, of specific users of the mobile devices, and/or of a group or groups of users, for generating traffic information, and/or for any other suitable purpose. Examples of driver experiences may include, but are not limited to, the effect of traffic on fuel consumption in daily commutes, the effect of changing commute time (e.g., commuting earlier or later than usually), difficulties associated with driving near school areas, the effect of traffic on braking, unusual or unsafe acceleration forces when driving above posted speed limits, and driving during and/or after abrupt weather changes. Additionally or alternatively, the driver experiences may include a private journey that a user desires to remain private by disabling and/or anonymizing data collection during the private journey.

One or more use cases may be defined for each of the driver experiences. In some implementations, multiple driver experiences may have similar use cases. Examples of use cases for the example driver experiences described previously may include, but are not limited to the following. The driver experience of the effect of traffic on fuel consumption in daily commutes may include one or more of a use case of going from home to work, a use case of going from work to home, a use case of dropping off kids at school, and a use case of picking up kids from school. The driver experience of the effect of changing commute time (e.g., commuting earlier or later than usual) may include one or more of a use case of going from home to work (or school) and a use case of going from work (or school) to home. The driver experience of difficulties associated with driving near school areas may include one or more of a use case of driving to a school from home, a use case of driving within a particular radius of the school, and a use case of driving curbside and dropping off a person near an entrance of the school. The driver experience of the effect of traffic on braking may include one or more of a use case of driving in stop-and-go traffic on the freeway, a use case of driving in heavy traffic before/during/after special events and within a particular radius of the special events, and a use case of driving in city traffic during rush hour. The driver experience of unusual or unsafe acceleration forces when driving above posted speed limits may include one or more of a use case of freeway driving during weekends, a use case of freeway exits with a radius of curvature lower than a particular threshold value, and a use case of re-recording for freeway exits that have been known to have unusual acceleration forces for other vehicles. The driver experience of driving during and/or after abrupt weather changes may include a use case of effect on speed of commute on same roads as usual commute, and a use case of effect on speed, gear, acceleration, and/or braking on journey to a snowy area from a warm area. The driver experience of a private journey may include a private use case.

In these and other implementations, the use case estimator module 330 may record estimated use cases in the storage 306 or the memory 308 via the communication module 328. Additionally or alternatively, the use case estimator module 330 may download use case templates from the server 102 via the communication module 328 and the communication unit 304. Additionally or alternatively, the use case estimator module 330 may receive use case estimation data from the storage 306 or the memory 308 via the communication module 328 to estimate use cases. Each estimated use case generated by the use case estimator module 330 may include a use case ID to identify the estimated use case.

The retriever module 332 can be software including routines for retrieving sets of sensor configuration parameters associated with estimated use cases. For example, the retriever module 332 may retrieve a set of sensor configuration parameters associated with a given estimated use case from the sensor configuration data 318. In some implementations, the sensor configuration data 318 may be arranged in a table or other data structure in which each set of sensor configuration parameters is associated with one or more use case IDs. Accordingly, the retriever module 332 may use a corresponding use case ID to lookup or otherwise retrieve a corresponding set of sensor configuration parameters from the sensor configuration data 318. The retriever module 332 may provide retrieved sets of sensor configuration parameters to the sensor configurator module 334.

Non-limiting examples of sets of sensor configuration parameters for the example foregoing use cases defined for the driver experience of difficulties associated with driving near school areas are provided in Table 1.

TABLE 1

Sets of sensor configuration parameters

Driver experience: Difficulties associated with driving near school areas
    Use Case 1—Driving to a school from home
        Enable:
            GPS at 1 hertz (Hz)
            Driver-facing camera at 5 Hz
            Brake sensor at 5 Hz
        Disable other sensors
    Use Case 2—Driving within a particular radius of the school
        Enable:
            GPS at 0.2 Hz
            Driver-facing camera at 3 Hz TABLE 1-continued Sets of sensor configuration parameters Brake sensor at 10 Hz
Vehicle front-facing camera 5 Hz
Gas pedal position sensor at 10 Hz
Disable other sensors
Use Case 3—Driving curbside and dropping off a person near an entrance of the school
Enable:
GPS at 3 Hz
Brake sensor at 10 Hz
Gas pedal position sensor at 10 Hz
Door sensors—upon use
Disable other sensors In the implementation of Table 1, the sets of sensor configuration parameters associated with the use cases specify different set of sensors to enable and disable. Each set of sensor configuration parameters additionally specifies a sampling frequency in hertz for some or all of the enabled sensors in the corresponding set. In use case 3, the door sensors are enabled "upon use" rather than specifying a particular sampling frequency. Table 1 is provided by way of example only and other implementations are possible for these and other use cases.

The sensor configurator module 334 can be software including routines for configuring the sensors 130 according to sets of sensor configuration parameters received from the retriever module 332. For example, the sensor configurator module 334 may enable at least some and/or disable at least some of the sensors 130, may set a sampling frequency of at least one of the sensors 130 that is enabled, may set a duration of time for which data from at least one of the sensors 130 is to be sampled, may set a sampling precision of at least one of the sensors 130 that is enabled, may set a compression format of sensor data generated by at least one of the sensors 130 that is enabled, or may otherwise configure the sensors 130 according to the corresponding retrieved set of sensor configuration parameters.

By configuring the sensors 130 according to use case-specific sets of sensor configuration parameters, the bus 310 may be optimized to log sensor data generated by the sensors 130 in a manner that may reduce and/or eliminate the presence of unnecessary sensor data on the bus 310. For example, any of the sensors 130 that generate data that is not relevant to an estimated use case can be disabled for all or a part of a journey to reduce consumption of resources of the bus 310. As another example, the sampling frequency, duration of sampling time, sampling precision, compression format, and/or other sensor configuration parameters may be adjusted up or down as appropriate for a given estimated use case to optimize the bus 310 for the given estimated use case.

The privacy determiner module 336 can be software including routines for ending a private mode activated by or through the privacy switch 315. For example, the privacy determiner module 336 may determine that the private mode and/or a corresponding private use case of a journey is ended responsive to at least one of: completion of a particular duration of time since a start of the journey, completion of a second journey subsequent to the journey, or a vehicle being started twice since the start of the journey. If the private mode is determined to have ended when the vehicle is turned off at the end of the journey and data collection begins beginning at the second journey, then the endpoint of the journey may not be private. In some implementations, however, the privacy determiner module 336 may not determine that the private mode is ended until completion of the second journey or the vehicle being started twice, either or both of which may result in the endpoint of the journey remaining private. Responsive to determining that the private mode is ended, the privacy determiner module 336 may output a signal to turn off the privacy switch 315 or may otherwise deactivate the private mode.

Methods

Figure 3B:
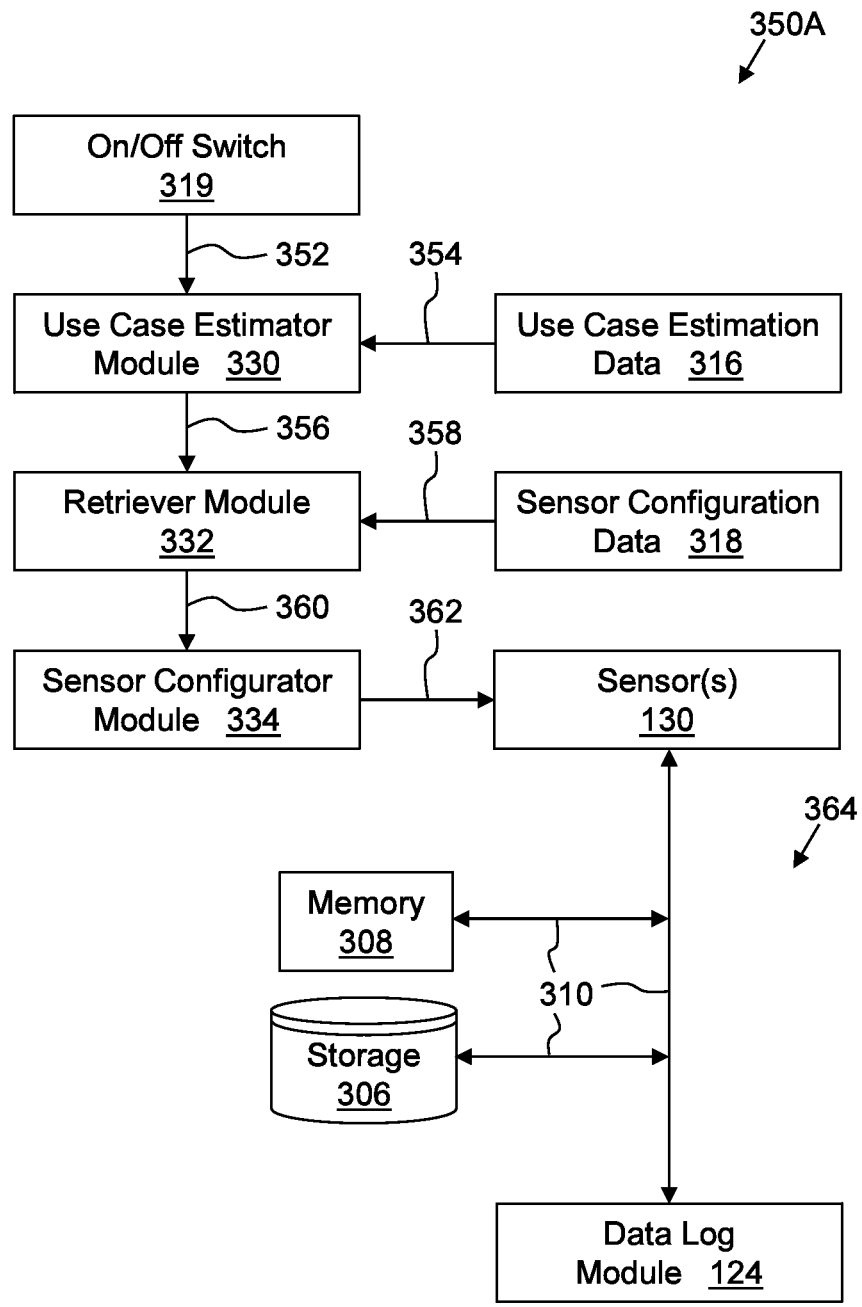
FIG. 3B is a flowchart of an example method to optimize a bus of the computing device of FIG. 3A.

Referring now to FIG. 3B, an example of a method 350A to optimize the bus 310 of the computing device 300 of FIG. 3A is described. In some implementations, the use case estimator module 330 receives a signal from the on/off switch 319 indicating that a mobile device has been started or turned on, as generally denoted at 352. The mobile device may include a vehicle. The use case estimator module 330 also receives use case estimation data 316, as generally denoted at 354. Responsive to the mobile device being started or turned on, the use case estimator module 330 estimates a use case of a journey of the mobile device based on the use case estimation data 316 and provides the estimated use case to the retriever module 332, as denoted at 356. The retriever module 332 retrieves, from the sensor configuration data 318, a set of sensor configuration parameters associated with the estimated use case, as denoted at 358. The retriever module 332 provides the set of sensor configuration parameters associated with the estimated use case to the sensor configurator module 334, as denoted at 360. The sensor configurator module 334 configures the sensors 130 according to the set of sensor configuration parameters to operate during at least a portion of the journey according to the set of sensor configuration parameters, as denoted at 362. In some implementations, and as generally denoted at 364, the method 350A may further include the data log module 124 logging sensor data generated by at least one of the sensors 130 to the memory 308 and/or the storage 306 via the bus 310 as the sensors 130 operate during at least a portion of the journey according to the set of sensor configuration parameters. The method 350A may optimize the bus 310 by configuring the sensors to only generate sensor data that is relevant to the estimated use case and to generate the sensor data at sampling frequencies, for durations of sampling time, at sampling precisions, and/or in compression formats that are relevant to the estimated use case.

Figure 3C:
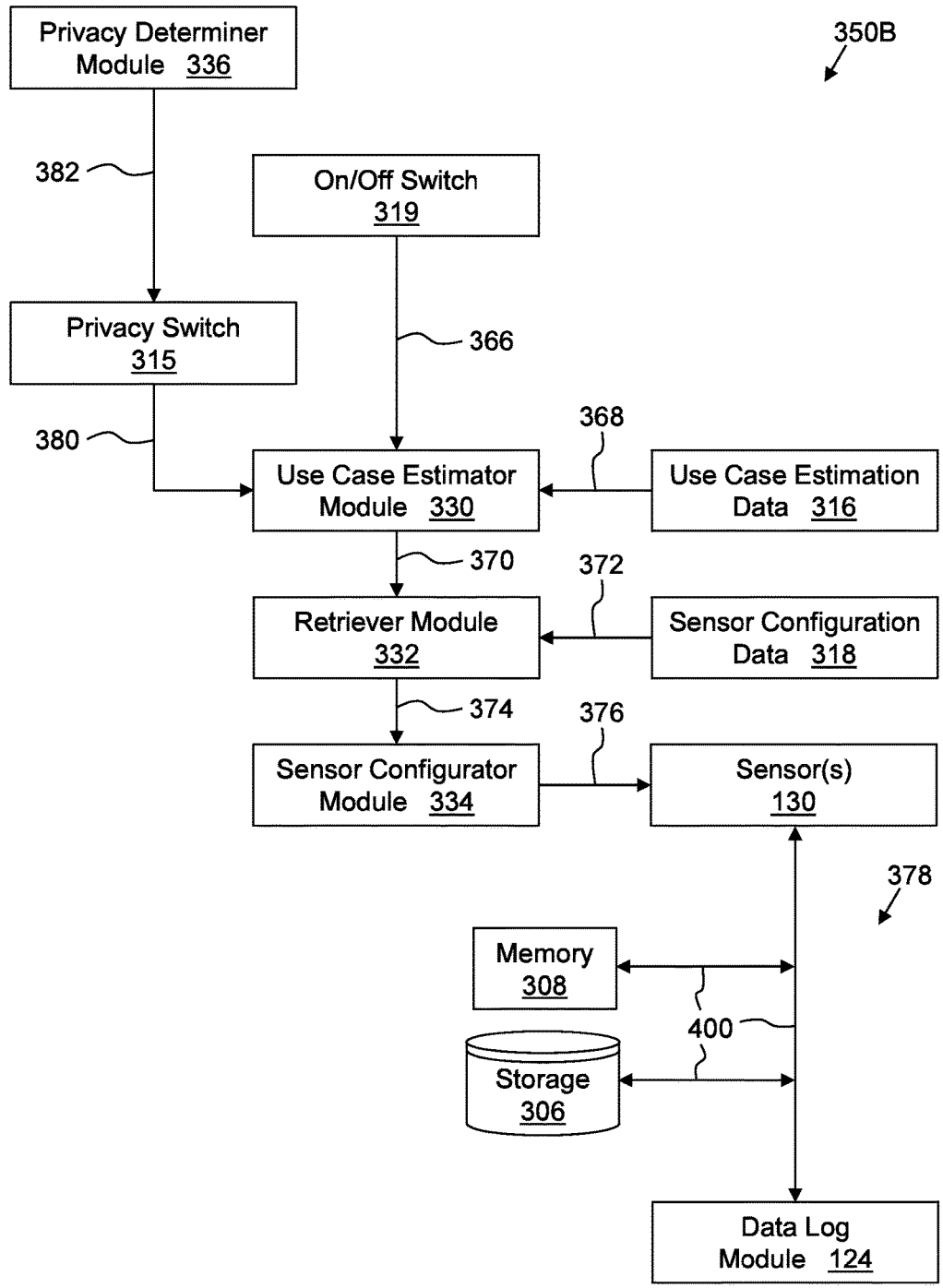
FIG. 3C is a flowchart of another example method to optimize the bus of the computing device of FIG. 3A.

Referring now to FIG. 3C, an example of another method 350B to optimize the bus 310 of the computing device 300 of FIG. 3A is described. In some implementations, the use case estimator module 330 receives a signal from the on/off switch 319 indicating that a mobile device has been started or turned on, as generally denoted at 366. The mobile device may include a vehicle. The use case estimator module 330 also receives use case estimation data 316, as generally denoted at 368. Responsive to the mobile device being started or turned on, the use case estimator module 330 estimates a use case of a journey of the mobile device based at least on the use case estimation data 316 and provides the estimated use case to the retriever module 332, as denoted at 370. The retriever module 332 retrieves, from the sensor configuration data 318, a set of sensor configuration parameters associated with the estimated use case, as denoted at 372. The retriever module 332 provides the set of sensor configuration parameters associated with the estimated use case to the sensor configurator module 334, as denoted at 374. The sensor configurator module 334 configures the sensors 130 according to the set of sensor configuration parameters to operate during at least a portion of the journey according to the set of sensor configuration parameters, as denoted at 376. In some implementations, and as generally denoted at 378, the method 350B may further include the data log module 124 logging sensor data generated by at least one of the sensors 130 to the memory 308 and/or the storage 306 via the bus 310 as the sensors 130 operate during at least a portion of the journey according to the set of sensor configuration parameters. The method 350B may optimize the bus 310 by configuring the sensors to only generate sensor data that is relevant to the estimated use case and to generate the sensor data at sampling frequencies, for durations of sampling time, at sampling precisions, and/or in compression formats that are relevant to the estimated use case.

In some implementations, the use case estimator module 330 additionally receives data from the privacy switch 315 indicating that a private mode has been activated and/or that the journey is to be a private journey, as denoted at 380. In these and other implementations, the estimated use case may be estimated as a private use case and the associated set of sensor configuration parameters may disable all of the sensors 130, may enable one or more of the sensors 130 that generate sensor data that relates to safety logging of a user while disabling the rest of the sensors 130, and/or may anonymize sensor data by removing information from the sensor data that may identify the user. In some implementations, the privacy determiner module 336 determines when the private mode is ended and outputs a signal to turn off the privacy switch 315 and/or to deactivate the private mode, as denoted at 382.

Figure 4:
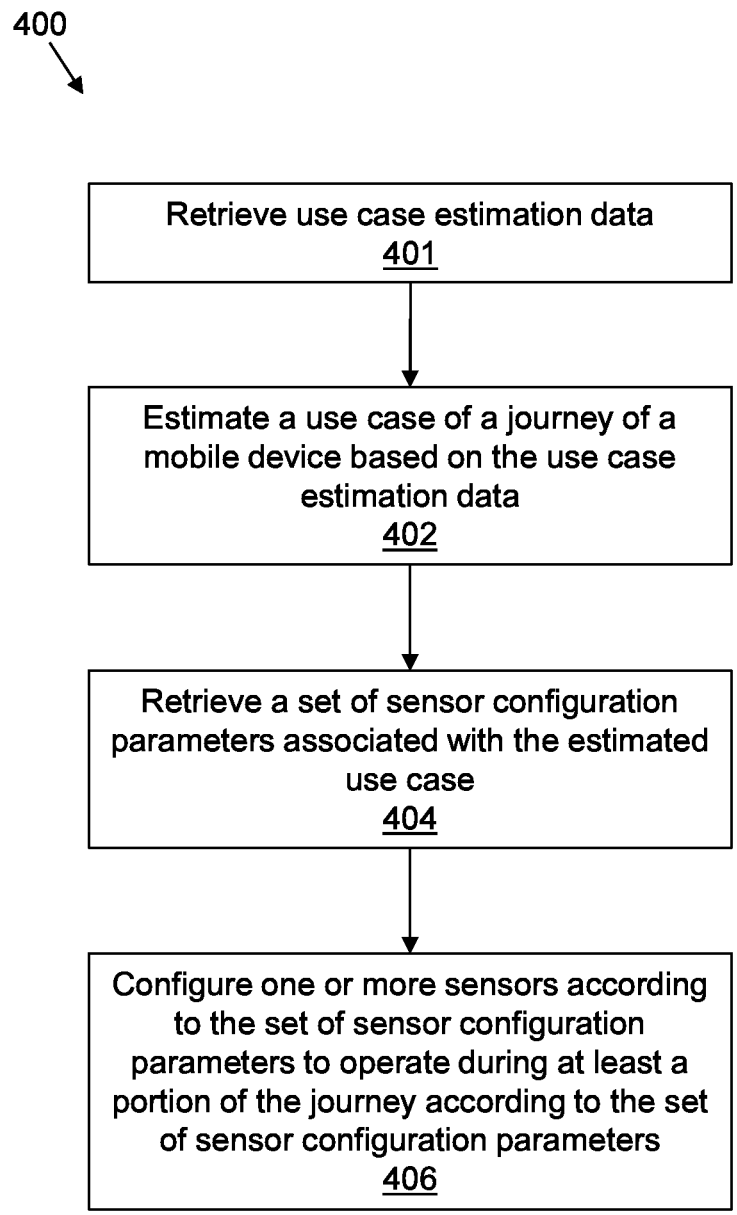
FIG. 4 is a flowchart of an example method to optimize a bus in a mobile device.

FIG. 4 is a flowchart of an example method 400 to optimize a bus in a mobile device. The method 400 may be implemented, in whole or in part, by the mobile device 108 or the server 102 of FIG. 1, the computing device 200 of FIG. 2, the computing device 300 of FIG. 3A, or another suitable device or system. The method 400 will be described in the context of FIG. 3A for convenience in the discussion that follows. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

In some implementations, the use case estimator module 330 retrieves 401 use case estimation data and estimates 402 a use case of a journey of a mobile device based on the use case estimation data. The retriever module 332 retrieves 404 a set of sensor configuration parameters associated with the estimated use case. The sensor configurator module 334 configures 406 one or more sensors (e.g., the sensors 130) according to the set of sensor configuration parameters to operate during at least a portion of the journey according to the set of sensor configuration parameters.

The mobile device may include a vehicle. The method 400 may additionally or alternatively include the use case estimator module 330 estimating the use case responsive to the vehicle being started and the use case estimator module 330 receiving data that indicates the journey is to be a private journey in which the one or more sensors are disabled. Estimating the use case may include estimating the use case as a private use case in which the one or more sensors are disabled. The set of sensor configuration parameters may indicate that each of the one or more sensors is to be disabled. Configuring the one or more sensors according to the set of sensor configuration parameters may include disabling each of the one or more sensors during that at least the portion of the journey.

The journey may include a first journey. The method 400 may additionally or alternatively include the privacy determiner module 336 determining that the private use case is ended responsive to at last one of: completion of a particular duration of time since a start of the first journey; completion of a second journey subsequent to the first journey; or the vehicle being started twice since the start of the first journey. The method 400 may additionally include the use case estimator module 330 estimating a subsequent use case after the private use case is ended, the retriever module 332 retrieving a set of sensor configuration parameters associated with the estimated subsequent use case, and/or the sensor configurator module 334 configuring the one or more sensors according to the set of sensor configuration parameters associated with the estimated subsequent use case to operate during at least a portion of the second journey according to the set of sensor configuration parameters associated with the estimated subsequent use case.

The method 400 may additionally or alternatively include the use case estimator module 330 receiving data that indicates the journey is to be a private journey. Estimating the use case may include estimating the use case as a private use case. The set of sensor configuration parameters may indicate that a first one of the one or more sensors that generates sensor data that relates to safety logging of a user is to be enabled during the at least the portion of the journey and that others of the one or more sensors that do not generate sensor data that relates to safety logging are to be disabled during the at least the portion of the journey.

The method 400 may additionally or alternatively include the use case estimator module 330 receiving data that indicates the journey is to be a private journey. The method 400 may additionally or alternatively include anonymizing sensor data generated by the one or more sensors during the at least the portion of the journey. For example, the sensor data may be anonymized by removing information from the sensor data that may identify the user according to the corresponding set of sensor configuration parameters.

In some implementations, the set of sensor configuration parameters may be tuned to a particular driver of the vehicle. Accordingly, the set of sensor configuration parameters associated with a given use case may be different for one driver than for another driver, as the set of sensor configuration parameters may be tuned consistent with, e.g., different driving styles and/or driving behaviors of the drivers.

In some implementations, the estimated use case may include an estimated first use case. In these and other implementations, the method 400 may additionally include the use case estimator module 330 estimating multiple use cases that the mobile device may experience during the journey. The estimated use cases include the estimated first use case and each of the estimated use cases may include a different one of multiple sets of sensor configuration parameters. The sensor configurator module 334 may reconfigure the one or more sensors according to a corresponding one of the sets of sensor configuration parameters each time an estimated current use case of the mobile device changes from one of the estimated use cases to a different one of the estimated use cases.

In some implementations, the method 400 may additionally include one or more of the following during the journey. The use case estimator module 330 may determine the estimated use case of the journey of the mobile device has changed such that the estimated use case is an estimated preceding use case. The use case estimator module 330 may estimate a current use case of the journey of the mobile device. The estimated current use case may be different than the estimated preceding use case. The retriever module 332 may retrieve a set of sensor configuration parameters associated with the estimated current use case that is different than the set of sensor configuration parameters associated with the estimated preceding use case. The sensor configurator module 334 may reconfigure the one or more sensors according to the set of sensor configuration parameters associated with the estimated current use case to operate during at least a second portion of the journey according to the set of sensor configuration parameters associated with the estimated current use case.

Some implementations disclosed herein include a computer program product including a non-transitory computer-usable medium that includes a computer-readable program. Execution of the computer-readable program on a computer may cause the computer to perform or may cause the computer to control performance of the method 400 and/or variations thereof. The non-transitory computer-usable medium may include, for example, the storage 128 of FIG. 1, the memory 308 of FIG. 3A, and/or the storage 306 of FIG. 3A. The computer-readable program may include, for example, the bus optimization module 126 of FIGS. 1 and 3A. The computer may include, for example, the computing device 300 of FIG. 3A.

Figure 5:
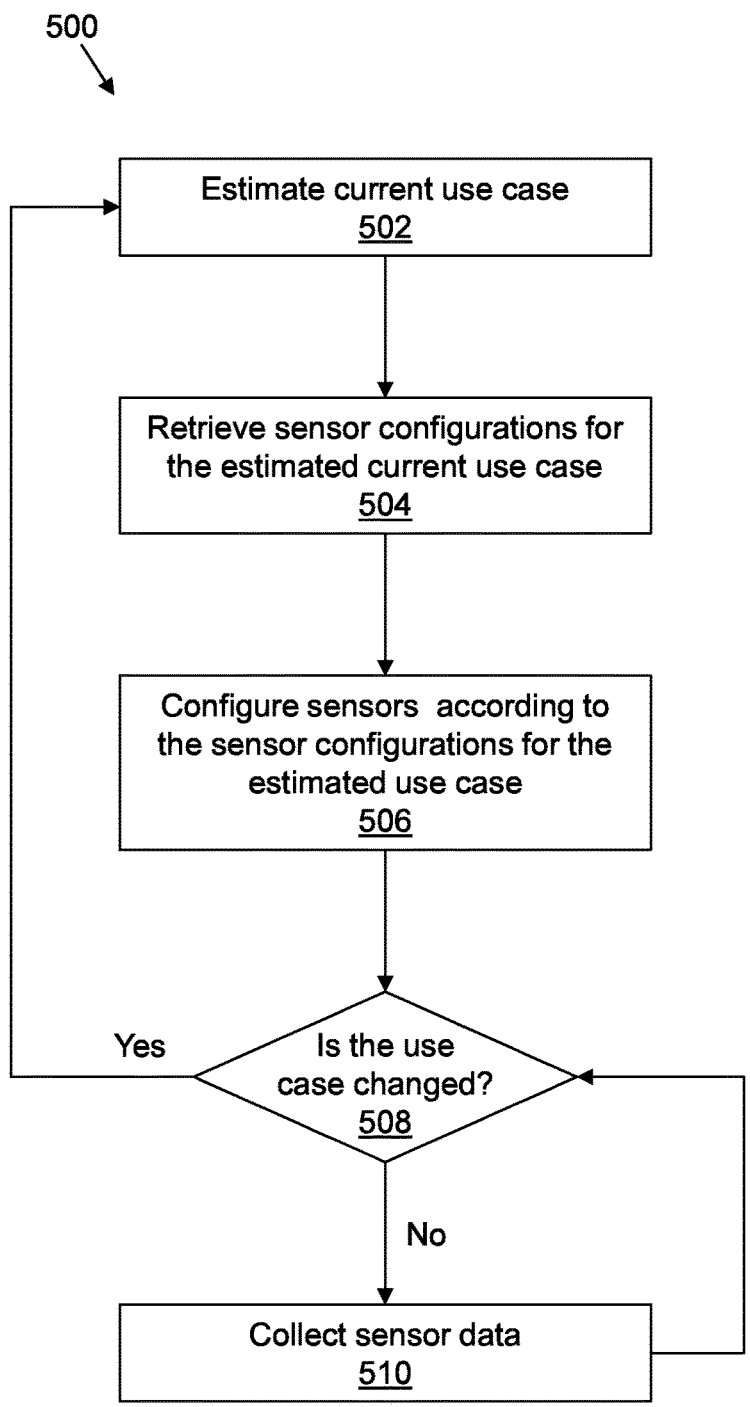
FIG. 5 is a flowchart of another example method to optimize a bus in a mobile device.

FIG. 5 is a flowchart of another example method 500 to optimize a bus in a mobile device. The method 500 may be implemented, in whole or in part, by the mobile device 108 or the server 102 of FIG. 1, the computing device 200 of FIG. 2, the computing device 300 of FIG. 3A, or another suitable device or system. The method 500 will be described in the context of FIG. 3A for convenience in the discussion that follows.

In some implementations, the use case estimator module 330 estimates 502 a current use case of a journey of a mobile device. The current use case may be estimated responsive to the mobile device being started, responsive to a change in use case, or responsive to some other factor or criterion. The retriever module 332 retrieves 504 sensor configurations for the estimated current use case. For example, the retriever module 332 may retrieve a set of sensor configuration parameters for the estimated current use case as described herein. The sensor configurator module 334 configures 506 one or more sensors (e.g., the sensors 130) according to the sensor configurations for the estimated use case. For example, the sensor configurator module 334 may configure the one or more sensors according to the set of sensor configuration parameters to operate during at least a portion of the journey according to the set of sensor configuration parameters. The use case estimator module 330 determines 508 if the use case is changed. For example, the use case estimator module 330 may listen for a pattern of use in use case estimation data, where the use case estimation data may include sensor data about the mobile device (e.g., a range of speed, brake usage, gas pedal usage, camera images, etc.), sensor data about an external environment of the mobile device (e.g., traffic data, map data, weather data), user-entered data (e.g., the user manually switches to eco-mode, overdrive mode, private mode, etc.). If the use case is determined to have changed ("Yes" at 508), the method 500 may return to 502. If the use case is determined to not have changed ("No" at 508), the data log module 124 may collect 510 sensor data. From 510, the method 500 may return to 508 and/or may terminate, e.g., when the mobile device is turned off.

Some implementations disclosed herein include a computer program product including a non-transitory computer-usable medium that includes a computer-readable program. Execution of the computer-readable program on a computer may cause the computer to perform or may cause the computer to control performance of the method 500 and/or variations thereof. The non-transitory computer-usable medium may include, for example, the storage 128 of FIG. 1, the memory 308 of FIG. 3A, and/or the storage 306 of FIG. 3A. The computer-readable program may include, for example, the bus optimization module 126 of FIGS. 1 and 3A. The computer may include, for example, the computing device 300 of FIG. 3A.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein.

This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for optimizing a data acquisition performance of one or more sensors of a mobile device, the method comprising:
    retrieving use case estimation data describing one or more historical journeys of the mobile device and one or more experiences during the one or more journeys that affected the operation of the one or more sensors of the mobile device;
    estimating a use case of a present journey of the mobile device based on the use case estimation data indicating that the present journey corresponds to at least one of the one or more historical journeys;
    retrieving a set of sensor configuration parameters associated with the estimated use case, wherein the set of sensor configuration parameters describe one or more parameter settings for the one or more sensors of the mobile device that are optimized for the estimated use case; and
    configuring, using a processor of the mobile device, the one or more parameter settings for the one or more sensors of the mobile device according to the set of sensor configuration parameters to operate during at least a portion of the present journey according to the set of sensor configuration parameters so that the data acquisition performance of the one or more sensors is optimized for the estimated use case as a result of being configured according to the set of sensor configuration parameters while operating during the portion of the journey.

2. The method of claim 1, wherein:
    the mobile device comprises a vehicle and the method is executed responsive to the vehicle being started, wherein the method further comprises:
        receiving data that indicates the present journey is to be a private journey in which the one or more sensors are disabled;
        determining that the use case is a private use case in which the one or more sensors are disabled;

determining that the set of sensor configuration parameters indicates that each of the one or more sensors is to be disabled; and configuring the one or more parameter settings for the one or more sensors according to the set of sensor configuration parameters, wherein the configuring comprises disabling each of the one or more sensors during the at least the portion of the present journey so that this portion of the present journey is private and not described by sensor data recorded by the one or more sensors during this portion of the present journey.

3. The method of claim 2, wherein the present journey comprises a first journey, the method further comprising:
determining that the private use case is ended responsive to at least one of:
completion of a particular duration of time since a start of the first journey;
completion of a second journey subsequent to the first journey; or
the vehicle being started twice since the start of the first journey; and
estimating a subsequent use case after the private use case is ended.

4. The method of claim 1, further comprising receiving data that indicates the present journey is to be a private journey, wherein:
estimating the use case comprises estimating the use case as a private use case; and
the set of sensor configuration parameters indicates that a first one of the one or more sensors that generates sensor data that relates to safety logging of a user is to be enabled during the at least the portion of the present journey and that others of the one or more sensors that do not generate sensor data that relates to safety logging are to be disabled during the at least the portion of the present journey so that this portion of the present journey is private and not described by sensor data recorded by the one or more sensors during this portion of the present journey with the exception that sensor data related to safety is recorded by the one or more sensors during this portion of the present journey.

5. The method of claim 1, further comprising:
receiving data that indicates the present journey is to be a private journey; and
anonymizing sensor data generated by the one or more sensors during the at least the portion of the present journey so that the sensor data is recorded but an identity of a user of the mobile device is not identifiable from the sensor data.

6. The method of claim 1, wherein the mobile device comprises a vehicle and the set of sensor configuration parameters is tuned to a particular driver of the vehicle based on the one or more historical journeys of the particular driver while operating the vehicle.

7. The method of claim 1, wherein the estimated use case comprises an estimated first use case, the method further comprising:
estimating a plurality of use cases that the mobile device may experience during the present journey, wherein the estimated plurality of use cases include the estimated first use case and each of the estimated plurality of use cases includes a different one of a plurality of sets of sensor configuration parameters; and
reconfiguring the one or more parameter settings of the one or more sensors of the mobile device according to a corresponding one of the plurality of sets of sensor configuration parameters each time the estimated current use case of the mobile device changes from one of the estimated plurality of use cases to a different one of the estimated plurality of use cases during the present journey so that the data acquisition performance of the one or more sensors is reconfigured each time the estimated user case of the mobile device changes during the present journey.

8. The method of claim 1, further comprising, during the present journey:
determining that the estimated use case of the present journey of the mobile device has changed such that the estimated use case comprises an estimated preceding use case;
estimating a current use case of the present journey of the mobile device, wherein the estimated current use case is different than the estimated preceding use case;
retrieving a set of sensor configuration parameters associated with the estimated current use case that is different than the set of sensor configuration parameters associated with the estimated preceding use case; and
reconfiguring one or more parameter settings of the one or more sensors according to the set of sensor configuration parameters associated with the estimated current use case to operate during at least a second portion of the present journey according to the set of sensor configuration parameters associated with the estimated current use case.

9. A computer program product comprising a non-transitory computer-usable medium including a computer-readable program that is operable to optimize a data acquisition performance of one or more sensors of a mobile device, wherein the computer-readable program when executed by a processor of the mobile device causes the processor to:
retrieve use case estimation data describing one or more historical journeys of the mobile device and one or more experiences during the one or more journeys that affected the operation of the one or more sensors of the mobile device;
estimate a use case of a present journey of flail the mobile device based on the use case estimation data indicating that the present journey corresponds to at least one of the one or more historical journeys;
retrieve a set of sensor configuration parameters associated with the estimated use case, wherein the set of sensor configuration parameters describe one or more parameter settings for the one or more sensors of the mobile device that are optimized for the estimated use case; and
configure the one or more parameter settings for the one or more sensors according to the set of sensor configuration parameters to operate during at least a portion of the present journey according to the set of sensor configuration parameters so that the data acquisition performance of the one or more sensors is optimized for the estimated use case as a result of being configured according to the set of sensor configuration parameters while operating during the portion of the journey.

10. The computer program product of claim 9, wherein the mobile device is a vehicle, and wherein:
the computer-readable program when executed by the processor further causes the processor to receive data that indicates that the present journey is to be a private journey in which the one or more sensors of the vehicle are disabled;

estimating the use case comprises estimating the use case as a private use case in which the one or more sensors are disabled;

the set of sensor configuration parameters indicates that each of the one or more sensors is to be disabled; and configuring the one or more parameter settings of the one or more sensors according to the set of sensor configuration parameters comprises disabling each of the one or more sensors during the at least the portion of the present journey so that this portion of the present journey is private and not described by sensor data recorded by the one or more sensors during this portion of the present journey.

11. The computer program product of claim 9, wherein:

the computer-readable program when executed by the processor further causes the processor to receive data that indicates the journey is to be a private journey;

estimating the use case comprises estimating the use case as a private use case; and the set of sensor configuration parameters indicates that a first one of the one or more sensors that generates sensor data that relates to safety logging of a user is to be enabled during the at least the portion of the journey and that others of the one or more sensors that do not generate sensor data that relates to safety logging are to be disabled during the at least the portion of the journey so that this portion of the present journey is private and not described by sensor data recorded by the one or more sensors during this portion of the present journey with the exception that sensor data related to safety is recorded by the one or more sensors during this portion of the present journey.

12. The computer program product of claim 9, wherein the computer-readable program when executed by the processor further causes the processor to:

receive data that indicates the present journey is to be a private journey; and anonymize sensor data generated by the one or more sensors during the at least the portion of the present journey so that the sensor data is recorded by an identity of a user of the mobile device is not identifiable from the sensor data.

13. The computer program product of claim 9, wherein the estimated use case comprises an estimated first use case, and wherein the computer-readable program when executed by the processor further causes the processor to:

estimate a plurality of use cases that the mobile device may experience during the present journey, wherein the estimated plurality of use cases include the estimated first use case and each of the estimated plurality of use cases includes a different one of a plurality of sets of sensor configuration parameters; and reconfigure the one or more parameter settings of the one or more sensors according to a corresponding one of the plurality of sets of sensor configuration parameters each time the estimated current use case of the mobile device changes from one of the estimated plurality of use cases to a different one of the estimated plurality of use cases so that the data acquisition performance of the one or more sensors is reconfigured each time the estimated user case of the mobile device changes during the present journey.

14. The computer program product of claim 9, wherein the computer-readable program when executed by the processor further causes the processor to, during the present journey:

determine that the estimated use case of the present journey of the mobile device has changed such that the estimated use case comprises an estimated preceding use case;

estimate a current use case of the present journey of the mobile device, wherein the estimated current use case is different than the estimated preceding use case;

retrieve a set of sensor configuration parameters associated with the estimated current use case that is different than the set of sensor configuration parameters associated with the estimated preceding use case; and reconfigure the one or more parameter settings of the one or more sensors according to the set of sensor configuration parameters associated with the estimated current use case to operate during at least a second portion of the journey according to the set of sensor configuration parameters associated with the estimated current use case.

15. A system comprising:

a processor; and a memory storing instructions that, when executed by the processor, cause the processor to:

retrieve use case estimation data describing one or more historical journeys of the mobile device and one or more experiences during the one or more journeys that affected the operation of the one or more sensors of the mobile device;

estimate a use case of a present journey of a mobile device based on the use case estimation data indicating that the present journey corresponds to at least one of the one or more historical journeys;

retrieve a set of sensor configuration parameters associated with the estimated use case, wherein the set of sensor configuration parameters describe one or more parameter settings for the one or more sensors of the mobile device that are optimized for the estimated use case; and configure the one or more parameter settings for the one or more sensors according to the set of sensor configuration parameters to operate during at least a portion of the journey according to the set of sensor configuration parameters so that the data acquisition performance of the one or more sensors is optimized for the estimated use case as a result of being configured according to the set of sensor configuration parameters while operating during the portion of the journey.

16. The system of claim 15, wherein the mobile device is a vehicle and wherein:

estimating the use case comprises estimating the use case as a private use case in which the one or more sensors are disabled;

the set of sensor configuration parameters indicates that each of the one or more sensors is to be disabled; and configuring the one or more parameter settings of the one or more sensors according to the set of sensor configuration parameters comprises disabling each of the one or more sensors during the at least the portion of the journey so that this portion of the present journey is private and not described by sensor data recorded by the one or more sensors during this portion of the present journey.

17. The system of claim 15, wherein:

execution of the instructions further causes the system to receive data that indicates the present journey is to be a private journey;

estimating the use case comprises estimating the use case as a private use case; and the set of sensor configuration parameters indicates that a first one of the one or more sensors that generates sensor data that relates to safety logging of a user is to be enabled during the at least the portion of the present journey and that others of the one or more sensors that do not generate sensor data that relates to safety logging are to be disabled during the at least the portion of the journey so that this portion of the present journey is private and not described by sensor data recorded by the one or more sensors during this portion of the present journey with the exception that sensor data related to safety is recorded by the one or more sensors during this portion of the present journey.

18. The system of claim 15, wherein execution of the instructions further causes the system to:

receive data that indicates the present journey is to be a private journey; and anonymize sensor data generated by the one or more sensors during the at least the portion of the present journey so that the sensor data is recorded but an identity of a user of the mobile device is not identifiable from the sensor data.

19. The system of claim 15, wherein the estimated use case comprises an estimated first use case, and wherein execution of the instructions further causes the system to:

estimate a plurality of use cases that the mobile device may experience during the present journey, wherein the estimated plurality of use cases include the estimated first use case and each of the estimated plurality of use cases includes a different one of a plurality of sets of sensor configuration parameters; and reconfigure the one or more sensors according to a corresponding one of the plurality of sets of sensor configuration parameters each time the estimated current use case of the mobile device changes from one of the estimated plurality of use cases to a different one of the estimated plurality of use cases so that the data acquisition performance of the one or more sensors is reconfigured each time the estimated user case of the mobile device changes during the present journey.

20. The system of claim 15, wherein execution of the instructions further causes the system to, during the journey:

determine that the estimated use case of the present journey of the mobile device has changed such that the estimated use case comprises an estimated preceding use case;

estimate a current use case of the present journey of the mobile device, wherein the estimated current use case is different than the estimated preceding use case;

retrieve a set of sensor configuration parameters associated with the estimated current use case that is different than the set of sensor configuration parameters associated with the estimated preceding use case; and reconfigure the one or more parameter settings of the one or more sensors according to the set of sensor configuration parameters associated with the estimated current use case to operate during at least a second portion of the journey according to the set of sensor configuration parameters associated with the estimated current use case.

* * * * *